United States Patent
Freeman et al.

(10) Patent No.: US 9,537,674 B2
(45) Date of Patent: Jan. 3, 2017

(54) VISUALIZATION METHOD FOR MESSAGES STORED IN AN INBOX

(75) Inventors: Karen Freeman, Toronto (CA); David Robert Macphie, Toronto (CA); Nasahn Adam Sheppard, Mill Valley, CA (US); Jason Edward Short, San Francisco, CA (US); Timothy Foster Wallack, New York, NY (US)

(73) Assignee: BCE INC., Verdun, Quebec (CA)

( * ) Notice: Subject to any disclaimer, the term of this patent is extended or adjusted under 35 U.S.C. 154(b) by 443 days.

(21) Appl. No.: 12/810,389

(22) PCT Filed: Dec. 24, 2007

(86) PCT No.: PCT/CA2007/002355
§ 371 (c)(1),
(2), (4) Date: Jun. 24, 2010

(87) PCT Pub. No.: WO2009/079737
PCT Pub. Date: Jul. 2, 2009

(65) Prior Publication Data
US 2010/0273457 A1    Oct. 28, 2010

(51) Int. Cl.
*G06F 3/048* (2013.01)
*H04L 12/58* (2006.01)
(Continued)

(52) U.S. Cl.
CPC .............. *H04L 12/587* (2013.01); *H04L 51/24* (2013.01); *H04M 3/537* (2013.01); *H04M 3/5335* (2013.01); *H04N 7/157* (2013.01)

(58) Field of Classification Search
CPC .. G06F 3/0481; G06F 3/0482; G06F 3/04817; G06F 9/4443; G06F 17/30961; H04L 41/22
(Continued)

(56) References Cited

U.S. PATENT DOCUMENTS 5,943,055 A * 8/1999 Sylvan ........................ 715/839
6,621,508 B1 * 9/2003 Shiraishi et al. ............. 715/810
(Continued)

FOREIGN PATENT DOCUMENTS

EP        0720081        7/1996

OTHER PUBLICATIONS

International Search Report; PCT/CA2007,002355; I. Siddiqui; Sep. 24, 2008.
Written Opinion; PCT/CA2007,002355; I. Siddiqui; Sep. 24, 2008.

*Primary Examiner* — Nicholas Augustine
(74) *Attorney, Agent, or Firm* — Fish & Richardson P.C.

(57) ABSTRACT

A method for notifying a user of a computer having a display about incoming messages stored in an inbox. The method includes the steps of receiving attribute information describing attributes of a plurality of messages in the inbox and generating message visualization structures associated with the respective messages and determining at least one non-textual visual feature of each message visualization structure on the basis of an attribute of a respective message. The method also includes rendering on the display the visualization structures within a graphical environment in which the message visualization structures convey information about the messages and their respective attributes in a non-textual list manner.

47 Claims, 6 Drawing Sheets

(51) Int. Cl.
*H04M 3/537* (2006.01)
*G06F 3/01* (2006.01)
*H04M 3/533* (2006.01)
*H04N 7/15* (2006.01)

(58) Field of Classification Search
USPC .......................................... 715/810, 811, 853
See application file for complete search history.

(56) References Cited

U.S. PATENT DOCUMENTS

| | | | |
|---|---|---|---|
| 6,700,591 B1 | 3/2004 | Sharpe | |
| 6,834,195 B2* | 12/2004 | Brandenberg et al. | 455/456.3 |
| 6,965,926 B1* | 11/2005 | Shapiro et al. | 709/219 |
| 7,958,457 B1* | 6/2011 | Brandenberg et al. | 715/789 |
| 8,282,488 B2* | 10/2012 | Walker et al. | 463/41 |
| 8,775,526 B2* | 7/2014 | Lorch et al. | 709/206 |
| 2002/0051017 A1* | 5/2002 | Wishoff | G06F 3/0481 |
| | | | 715/774 |
| 2002/0160817 A1 | 10/2002 | Salmimaa et al. | |
| 2002/0163538 A1* | 11/2002 | Shteyn | 345/752 |
| 2003/0063072 A1* | 4/2003 | Brandenberg et al. | 345/173 |
| 2003/0063128 A1* | 4/2003 | Salmimaa et al. | 345/810 |
| 2003/0163525 A1* | 8/2003 | Hendriks et al. | 709/204 |
| 2004/0127284 A1* | 7/2004 | Walker et al. | 463/30 |
| 2004/0179657 A1 | 9/2004 | Vacquie | |
| 2005/0235226 A1* | 10/2005 | Watanabe et al. | 715/835 |
| 2006/0085758 A1* | 4/2006 | Backus | 715/772 |
| 2006/0148551 A1* | 7/2006 | Walker et al. | 463/16 |
| 2007/0094620 A1* | 4/2007 | Park | 715/862 |
| 2007/0120856 A1* | 5/2007 | De Ruyter et al. | 345/440 |
| 2007/0168425 A1* | 7/2007 | Morotomi | 709/204 |
| 2008/0052945 A1* | 3/2008 | Matas | G06F 3/0485 |
| | | | 34/173 |
| 2008/0163118 A1* | 7/2008 | Wolf | 715/835 |
| 2008/0216022 A1* | 9/2008 | Lorch | G06F 3/04817 |
| | | | 715/847 |
| 2008/0250012 A1* | 10/2008 | Hinckley et al. | 707/5 |
| 2009/0089716 A1* | 4/2009 | Chen et al. | 715/863 |
| 2009/0094518 A1* | 4/2009 | Lawther | G06F 3/04817 |
| | | | 715/716 |
| 2009/0164923 A1* | 6/2009 | Ovi | 715/764 |
| 2010/0179991 A1* | 7/2010 | Lorch et al. | 709/206 |

* cited by examiner

VISUALIZATION METHOD FOR MESSAGES STORED IN AN INBOX

FIELD OF THE INVENTION

The present invention relates to electronic message visualization techniques.

BACKGROUND OF THE INVENTION

Electronic messages such as electronic mail, text messaging or Short Message Service (SMS) or voice mail (with or without video) that are delivered to a user's inbox are usually presented to the user in a textual list format. Thus, the messages appear to the user on a display as a list of consecutive items that can be manipulated. For instance, the user can open each item to read or listen to it, edit the item, delete the item or move it to a different folder or location for storage purposes.

The typical list of electronic messages is also designed to convey to the user information about certain attributes of each message. For example, in the case of electronic mail messages the list will show the originator of the message, the time at which the message was sent, its degree of importance and whether or not an attachment is present, among others. Color can be used to convey attribute information as well. In the case of voice mail messages the list can show the time at which a message was delivered and the caller, among others.

The presentation of electronic messages in a list format is not particularly user friendly. The user is required to focus his or her attention to each message item in the list in order to gather a general sense of what the message is all about. Thus, it would be highly desirable to provide a more intuitive electronic message visualization structure that communicates to a user information on electronic messages.

SUMMARY OF THE INVENTION

As embodied and broadly described herein the invention provides a computer readable storage medium containing a program for execution by a computer having a display, the program implementing a message notification system to notify a user about incoming messages stored in an inbox. The computer can be any type of computer platform at which the user's inbox can be accessed. This type of computer will usually have a processor for executing the program and some sort of display under control of the processor. For instance, the computer can be a computer intended to perform general purpose tasks such as document editing and electronic messaging. Another possible example is a computerized telephone device that is intended primarily for conducting voice and SMS communications and where voice mail messages are received at a voice mail inbox. The computerized telephone device can be stationary or portable. Note that for the purpose of this specification, "voice mail" is intended to encompass messages that include exclusively voice and also messages that contain voice and some other type of information such as video.

The notification system has an input to receive information about an attribute of at least one of the messages in the inbox. Examples of attributes include the size of the message, the date at which the message was delivered, the importance of the message, the originator of the message, the presence or not of an attachment, among many others. The attribute of the message can be obtained directly from the network that delivers the message. For instance in the case of a voice mail message, the identity of the calling party can be obtained as a caller ID information from the network. Alternatively, the attribute can be derived locally by the computer. Again in the case of a voice mail message, the size of the message can be determined locally without the need to obtain any information from the network.

The program implements a processing entity that generates a message visualization structure associated with each message, the processing entity determining at least one non-textual visual feature of the message visualization structure on the basis of the attribute of the respective message. In a non-limiting example of implementation, a single visualization structure is associated with a message, either e-mail, SMS or voice mail message. The visualization structure is a graphical element, such as geometric shape, either bi-dimensional or three dimensional, that indicates the existence of the message in the user's inbox. At least one of the message attributes determines a visual feature of the visualization structure. By "visual feature" is meant a feature of the visualization structure that the user can see on the computer display. Examples of visual feature include color, size, shape, or location in the screen.

Thus, the graphical environment with the visualization structures allows a user to intuitively navigate within a virtual space and hence easily determine that electronic messages have been received, thus overcoming the disadvantages of browsing and searching a typical electronic mail list.

The processing entity has an output for releasing output data to cause the display of the computer to render the visualization structures. The output data defines a graphical environment in which the message visualization structures convey information about the respective messages in a non-textual list manner. "Non-textual list" means a relationship between the visualization structures that is other than textual elements arranged into a list. Note that "non-textual list" does not imply that the visualization structures or other elements of the display do not contain text. Text may be present in each visualization structure to provide additional information about the message that is not conveyed via the visual feature or to replicate the information conveyed via the visual feature but in text format.

As embodied and broadly described herein the invention also provides a computer readable storage medium containing a program for execution by a computer having a display, the program implementing a screen saver that also notifies a user about incoming messages stored in an inbox. The screen saver has an input for receiving information about messages in the inbox and a processing entity for generating a visualization structure associated with each message. The processing entity has an output interface for releasing output data to cause the display of the computer to render the visualization structures, the output data defining a graphical environment in which the message visualization structures are rendered on the display and convey information about the messages in a non-textual list manner.

BRIEF DESCRIPTION OF THE DRAWINGS

A detailed description of examples of implementation of the present invention is provided hereinbelow with reference to the following drawings, in which.

Figure 1:
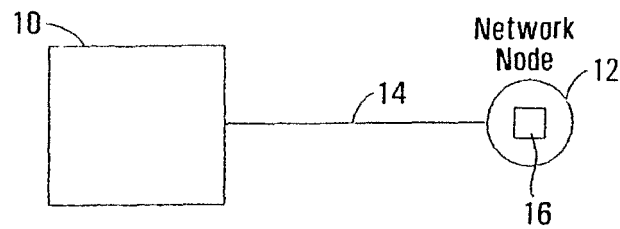
FIG. 1 is a block diagram of a non-limiting example of implementation of the invention illustrating a computer connected to a network for receiving electronic messages from a network.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 illustrates a computer device 10 that is connected to a network node 12 for receiving electronic messages. The computer 10 can be a general purpose computer on which various tasks can be performed such as word processing, photo editing and web browsing, in addition to electronic mail reception. Alternatively, the computer 10 can be a specialized device that runs on a computing platform and it is intended to perform a limited number of tasks. An example of such specialized device can be a computerized telephone that is intended to run primarily voice communications. The voice communications can carry exclusively voice information or a combination of voice and other type of information such as video. As such, the computerized telephone has hardware to allow the voice calls to be initiated from the telephone by the user and also voice calls to be received. In addition the computerized telephone can also include support functions intended to facilitate voice communications, such as voice mail handling functions and contact managing functions among many others. Note that the voice mail (exclusively voice, or voice in combination with other data such as video) can be local or network based. In the case of local voicemail the inbox could be located in the computerized telephone and any messages are thus stored locally. In contrast, a network based voice mail service may use an inbox to store messages that is remote from the computerized telephone. For example, the inbox could be located at a network node where the messages can be accessed remotely by the computerized telephone.

The computer 10, either in the general purpose form or in a specialized form would normally include a processor to execute program instructions. The processor is connected to a memory in which the program to be executed is stored. In addition, the computer 10 has a user interface allowing the user to interact with the computer 10. The user interface has a display (not shown) and an input mechanism allowing the user to input commands and/or data to the computer. In the case of a general purpose computer 10 the input mechanism can be a keyboard and/or a pointing device. Alternatively, speech recognition or touch sensitive surfaces can be used. When the computer 10 is of a specialized form the input mechanism can include a limited set of keys to fit space restrictions while allowing the user to input all the necessary commands. Another possibility is to provide soft keys that may use part of the display to identify their purpose or function.

The computer 10 connects to the network node 12 via a link 14. The link 14 can be a wireline link, namely a cable or optical fiber that runs from the computer 10 to the network node 12. Alternatively, the link 14 can be a wireless link. With such wireless link the computer 10 becomes a mobile device. Also note that the link 14 can be a hybrid structure, using a wireline segment and a wireless segment.

In a specific example, the link 14 is a Public Service Telephone Network (PSTN) link. In another example, the link 14 is a packet connection link allowing packetized data to be exchanged between the computer 10 and the network node 12. Other types of links and/or a plurality of different links (ex PSTN and packet based) are also possible without departing from the spirit of the invention. It should expressly noted that the particular type of link for connecting the computer 10 to the network node 12 is not critical to the success of the invention, as long as the link is of such nature as to allow the computer 10 and the network node 12 to communicate.

In the more specific example of a specialized computer 10 for use primarily to conduct voice communications, which for simplicity will be referred hereinafter as "computerized telephone", the link 14 is installed between the central station of the telephone company that embodies the network node 12 and the user's residence in which the computerized telephone 10 is located. The link 14, which can be a PSTN link, is used primarily to carry voice and data signals.

In a specific example, the computerized telephone 10 is a cordless telephone that includes a base station and one or more handsets that communicate wirelessly with the base station. The base station can be provided with a display on which notifications about electronic messages can be made. Alternatively the handsets can be provided with respective displays on which the notifications can be made. Yet another option is to provide both the base station and the handsets with respective displays to notify users visually about electronic messages.

In a first embodiment, when the user subscribes to the voice mail service, voice mail messages can be left in a voice mail inbox for later retrieval by the user. The computerized telephone includes some type of voice mail managing program that allows the user to retrieve messages in the inbox. Specifically, the voice mail managing program allows the user at the computerized telephone to play a message, store the message, forward the message or delete a message placed in the inbox.

The inbox where the voice mail messages are placed is shown schematically at 16. The inbox 16 is essentially a storage location of adequate size where voice mail messages that have been previously digitized are stored. In the example shown in the drawings, the inbox is located on the network side of the system, namely at the node 12, but it will be recognized that the inbox can be located, practically speaking, anywhere in the network as long as messages for the particular subscriber can be adequately stored, retrieved and managed. Alternatively, the inbox 16 can be located on the subscriber side of the system, namely within the computerized telephone 10. In this instance all the operations for storing, retrieving and managing voice mail messages are performed locally.

Figure 2:
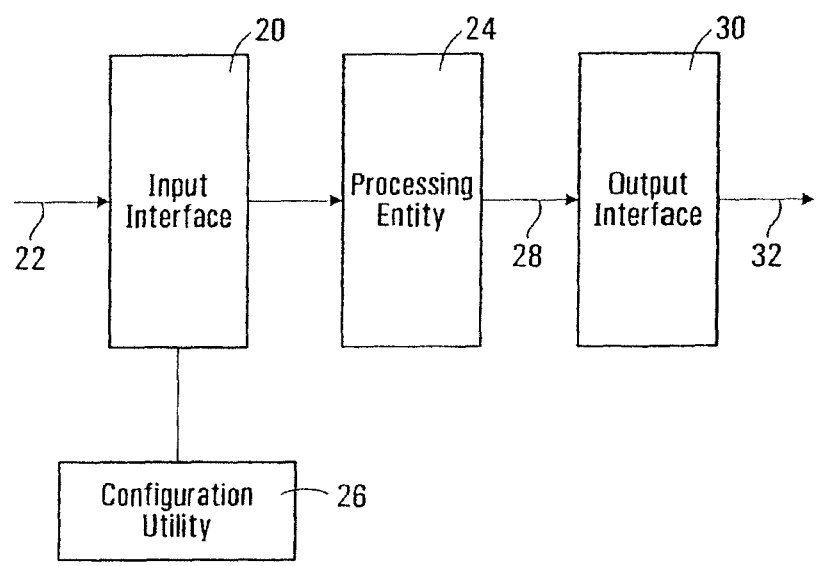
FIG. 2 is a more detailed functional block diagram of a program executed by the computer for notifying users about incoming messages stored in the inbox.

Irrespective of the location of the inbox 16, the computerized telephone 10 runs a program implementing a voice mail message notification system to notify a user about incoming voice mail messages stored in the inbox 16. A functional block diagram of the program is shown in FIG. 2.

The program has an input interface 20 that receives input data at 22. The input data is derived from the inbox 16 as it will be discussed later. Generally speaking, the input data notifies the input interface 20 about the messages that exist in the inbox and also conveys information about attributes of those messages.

Several possibilities exist for the input interface 20 to gain access to the input data. One option is to push the input data to the input interface 20 automatically. For instance, the voice mail service that manages the inbox 16 establishes communication with the input interface to send to the input interface the input data. The communication can be initiated periodically, or upon occurrence of one or more specific events, such as the reception of a new message by the inbox 16. Another option is for the input interface 20 to pull the data from the inbox 16. In this instance, the input interface 20 establishes communication with the voice mail service by sending a request to prompt the voice mail service to generate the input data. In doing so, the input interface 20 may need to authenticate itself to the voice mail service in order to gain access to the inbox 16 contents. Accordingly, the input interface 20 may be provided with a log-in functionality that will supply in the request to the voice mail service log-in credentials such as a user name and/or password or any other authentication information necessary to complete the transaction.

In a specific example of implementation, the input data 22 could convey information about all or some of the messages that are present in the inbox, namely messages that have been played by the user but not deleted or stored, messages that have been stored and messages that have been recently received but not yet played. In addition, the input data also conveys information about one or more attributes of the messages in the inbox 16. Examples of attributes are as follows:

- The originator of the message: This would normally be an identifier of the subscriber that left the message, such as the telephone number of the subscriber. This information can be obtained via the caller ID from the network when the call is placed or by exchanging specific messages with the calling party. Other non-limiting examples of information that could convey the identity of the subscriber include an IP address, the name of the subscriber, and identification information extracted from a Session Initiation Protocol (SIP) message in the case of a packet based call such as a VoIP call.
- The size of the message: This can be established on the basis of the amount of space the voice mail message occupies in the inbox 16, or the indicated duration (length) of the message.
- Number of messages left by the same person.
- Message personalization attributes that may have been specified by the sender. Examples include pictures or animation that the sender may specify when leaving the message and which become part of the message as it is stored in the inbox.
- The relative importance or urgency of the message: if the voice mail managing program allows a caller to specify a degree of urgency, this information may be relayed to the input interface 20.
- The status of the voice mail message, namely played, stored or not yet played.
- The time at which the message was left in the inbox 16.
- The subject of the voice mail message converted into textual format. This option may require a speech recognition functionality to process the utterance recorded by the subscriber that left the message to convert the voice to text.
- Identification of the intended voice mail message recipient. In one example, when multiple voice mail inboxes are present and where each inbox is associated to a different person, the identification that may be provided is the identification of the voice mail inbox where the message is stored (the inbox of the kids, the inbox of the parents, etc.). In a different example, where a common voice mail inbox is shared by a group of individuals, say a family, the identification that may be provided is the identification of the individual for whom the message has been left.

The input interface 20 receives the above information and it provides it to a processing entity 24. Optionally, the input interface will filter the information received via the input data at 22 such as to present to the processing entity only the information that the user deems relevant. The filtering function can be set via a configuration utility 26 that the user can run when desired. The configuration utility determines how the input interface will manage the information contained in the input data. Examples of the settings that can be controlled via the configuration utility 26 include:

- The type of messages for which a notification will be made. By default, a notification can be made for all messages but the user may wish to filter the messages such as to obtain a notification only in connection with the messages that have not been played yet and block notification on played messages or stored messages.
- The manner in which the notification for the messages will be made, such a selection of the visual elements that make up the notification.
- Filter messages by callers, such as to provide a notification in connection with messages from certain callers but not from others.
- Filter messages depending on time and date, such as to provide notification about messages received during business hours but not those received after business hours.
- Filter by level of urgency, such as by providing notification about urgent messages but no notification or a different notification for less urgent messages.

Note that the filtering function does not need to be the same for all the users, if multiple users share the computerized telephone. For instance, the configuration utility 26 may be designed to support multiple users, where each user is allowed to set specific filtering functions. When voice mail messages are identified as being associated to a given user, for instance on the basis of the inbox in which the voice mail message is stored, or by any other suitable way, the appropriate, user specific filtering function is then invoked to filter only those messages in that inbox.

The message attribute information, either filtered or not filtered depending upon the particular implementation, is delivered to the processing entity 24. The processing entity 24 generates the visual elements that provide the notification about the voice mail messages in the inbox 16. More specifically, the processing entity generates a message visualization structure that is used to provide notification about the message. The message visualization structure is a visual indicator that shows the existence of the message and that has visually perceptible property that shows an attribute of the message. Specific examples of visualization structures will be provided later in the specification, but in general terms the visualization structure can be any graphical shape, either two-dimensional or three-dimensional (in appearance only on a two-dimensional display), appearing on the display of the computerized telephone and denoting at least one voice mail message. The shapes can be purely geometric shapes or pictograms. Examples of purely geometric shapes include circles, rectangles, triangles, etc. Pictograms can be any suitable symbols denoting concepts, activities or physical locations, among others.

The processing entity 24, in addition of generating the visualization structures also determines a visually perceptible property of each visualization structure on the basis of the attribute of the respective voice mail message. Examples of visually perceptible properties that can be altered according to message attributes include:

The particular geometric shape of the visualizations structure, for instance circle, rectangle or triangle, depending upon the attribute to display. For example, the shape of the visualization structure could indicate the importance of the voice mail message, such as circle denoting a message of regular importance, a triangle denoting a message of high importance and a rectangle denoting a message of low importance.

The color of the visualization structure.

The size of the visualization structure.

In the case of pictograms, the particular symbol that is used.

The location of the visualization structure on the display. For instance the display may be designed such that all the voice mail messages of high importance are placed in a certain location of the display, while voice mail messages of lower or regular importance are placed elsewhere.

Two-dimensional or three-dimensional appearance of the visualization structure.

The texture (as it appears visually) of the visualization structure.

Motion or animation imparted to the visualization structure.

The relationship of the visualization structure to another visualization structure. For instance, two visualization structures shown as being stacked may indicate voice mail messages from the same caller.

Variables altering a virtual reality rendering, such as for example, changing the appearance of simulated life-forms.

The processing entity 24 therefore outputs output data 28 which describes the visualization structures and also defines the graphical environment in which the visualization structures will be rendered. The graphical environment is characterized in that the relationship between the visualization structures is a non-textual list relationship. As indicated previously, "non-textual list" means a relationship between the visualization structures that is other than textual elements arranged into a list. Specific examples of a graphical environment where the visualization structures are arranged in a non-textual list manner include:

The visualization structures are static and randomly dispersed on the display.

The visualization structures move on the display, where the movement may be random or simulate a physical effect such as the visualization structures bouncing off each other when "touching" or simulating the effect of gravity and bounding up and down.

The visualization structures are grouped within different areas of the screen, where each area corresponds to a certain message attribute. In other words, visualization structures in a given area of the screen share a common attribute such as the same caller or date of call.

The visualization structures are arranged into groups simulating a physical arrangement of objects, for example they appear stacked one on top of the other.

It should be expressly noted that while the relationship between the visualization structures is such that they are in a non-textual list format, this does not preclude the presence of text elements within the visualization structures or at another location of the display. The text elements can be used to convey additional information that the graphic components of the visualization structures cannot, for instance indicate the name and/or number of the calling party that has left the voice mail, the date and time of the voice mail, or any other attribute of the voice mail message.

In a specific and non-limiting example of implementation, the text elements associated with a certain visualization structure are located within the perimeter of the visualization structure and visually form part of the visualization structure. In this fashion, as the visualization structure moves, the text element will also move with it.

The output data 28 that is generated by the processing entity 24 is delivered to an output interface 30 that generates the electronic signals at output 32 to drive a display (not shown).

Figure 3:
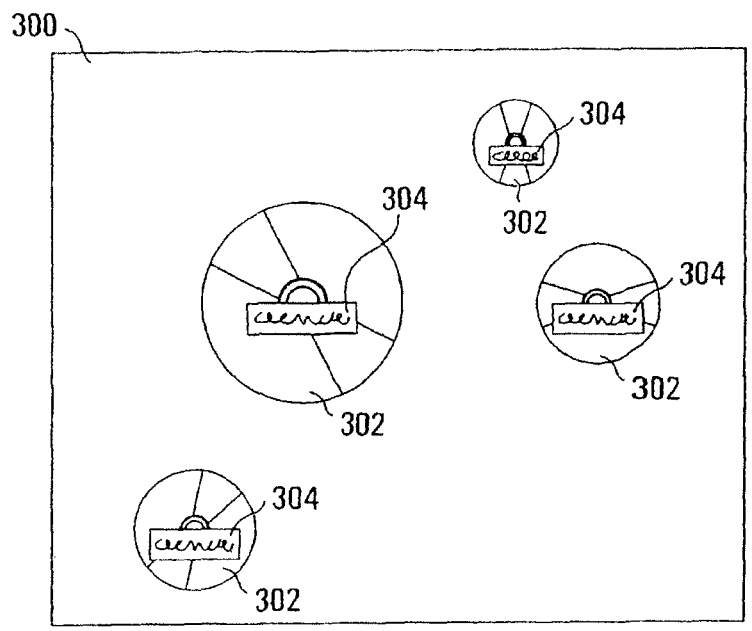
FIGS. 3 to 6 are examples of message visualization structures.

FIG. 3 is a non-limiting example of implementation, showing a display on which visualization structures depicting individual voice mail messages are rendered. The display 300 shows four visualization structures 302 that all have the same shape, namely disks. Each visualization structure is associated with a single voice mail message. The size of each visualization structure 302 denotes the size or length of each voice mail message; the larger the visualization structure, the larger the voice mail message. While not shown in the drawings, other attributes of the voice mail messages can be described graphically by the visualization structures 302, such as for example the importance of the voice mail message by changing the color of the visualization structure.

Each visualization structure 302 is provided with a text field in which textual information is presented to the user. The textual information can be related to the respective voice mail message or not related to it. For instance, the textual information can provide the identity of the caller, the time of call, etc.

In a possible variant, the visualization structures 302 can be animated. The animation can be such that they move randomly on the display 300. In another possibility the movement simulates a physical effect such as the effect of gravity. For example, the visualization structures 302 can behave like bouncing balls.

More complex animation schemes can be used, where the animation can be used to denote an attribute of the voice mail message. The visualization structures 302 can appear to the user as spinning disks; the faster the spin the more urgent the voice mail message is. Another possible example of animation is to play a small video clip within the boundary of the visualization structure 302, depicting as an icon (spouse, kids or boss) or in person (a picture of spouse, kids or boss) the particular caller that has left the voice mail message. In addition, the animation can be used to depict the intended recipient of the message, such as by displaying an icon or picture of the intended recipient.

Figure 4:
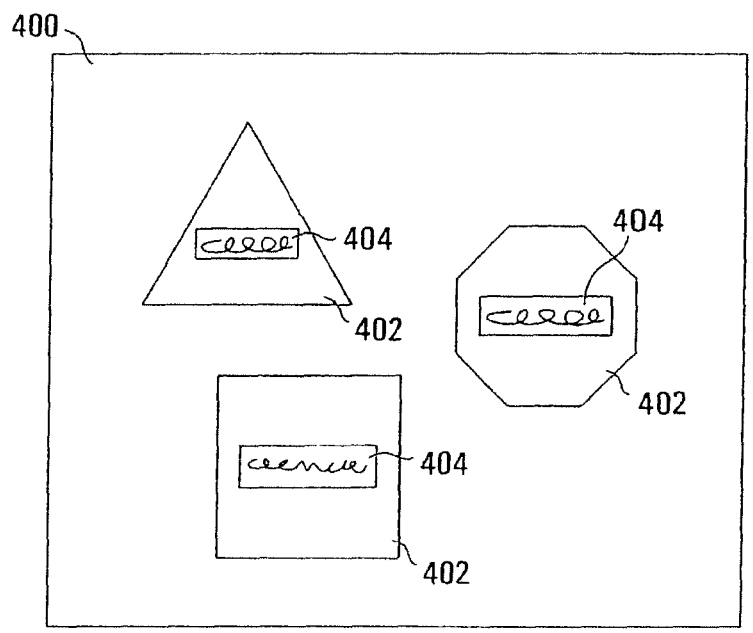

FIG. 4 depicts another example of implementation. In this example, the visualization structures 402 appear as different geometric figure, the particular geometric figures denoting an attribute of the voice mail message. For instance, a triangle denotes an urgent message, a square a message of regular importance and a hexagon a message of low importance. As with the previous example, the visualization structures 402 are provided with text fields 404. Size information can be communicated by changing the thickness of the outline of the visualization structures 402, the thicker the outline the larger the message. As with the previous example, the visualization structures can also be animated.

Figure 5:
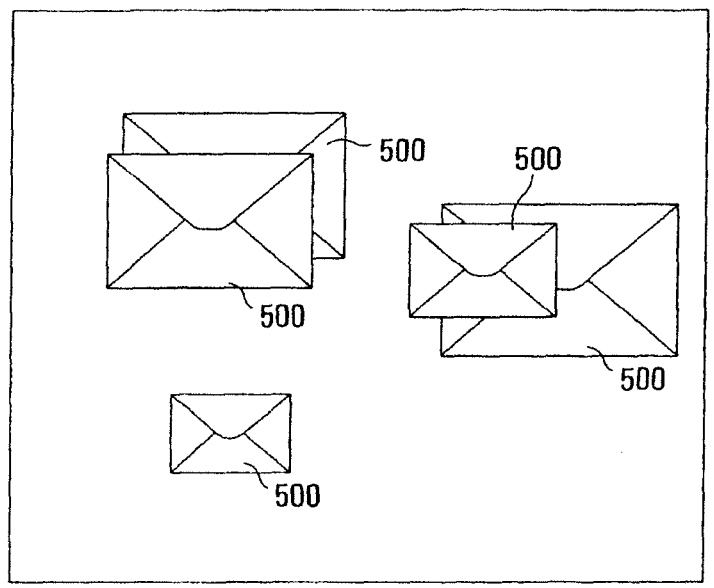

FIG. 5 is yet another example of implementation where the visualization structures are shown as pictograms 500. Here, the pictograms symbolize electronic mail messages and their size denotes the length (size) of the voice mail message. The visualization structures are shown as being stacked which denote messages sharing a common attribute such as the same caller. As with the previous examples, color, animation and text can be used to provide additional information regarding the voice mail messages.

Figure 6:
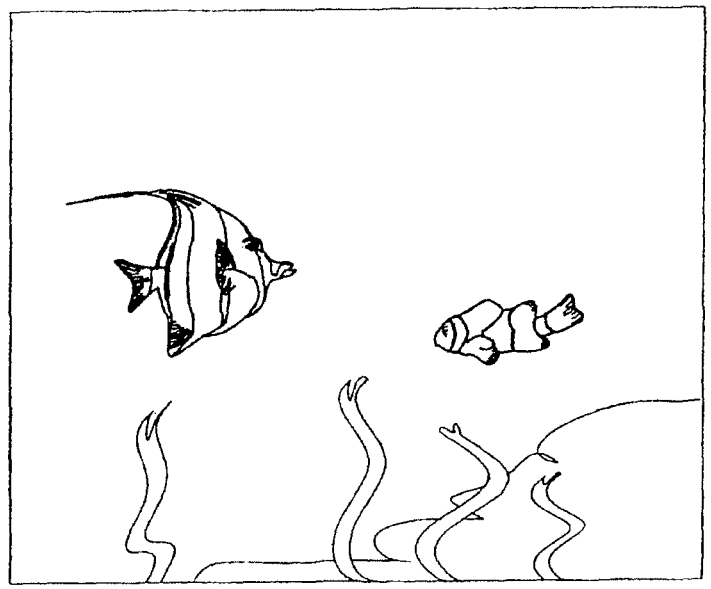

FIG. 6 is yet another possible example of implementation where the graphical environment in which the visualization structures are shown is a virtual reality. The virtual reality possesses the "look and feel" of a real-world environment.

In the example shown the virtual reality depicts an aquarium with floating fish, each representing a visualization structure. The size of the fish depicts the size of the voice mail message the particular type of fish may reflect the identity of the caller, among many other possibilities. Yet another possibility is to have a particular type of fish depict the identity of the intended message recipient.

Referring back to FIG. 2 and the description relating to the architecture of the mail notification program, the input data 22 which is supplied to the input interface 20 and which describes the attributes of the messages for which notification is desired, can be obtained from different sources. One of the sources is the facility which manages the inbox 16, which can convey attributes of the voice mail message. Accordingly, if the inbox is located at the network side, namely in the network node 12, the network can supply message attribute information to the input interface 20. This information is conveyed via the link 14. Alternatively, if the inbox is managed locally, the attribute information would be available from the local voice mail inbox management program.

Figure 7:
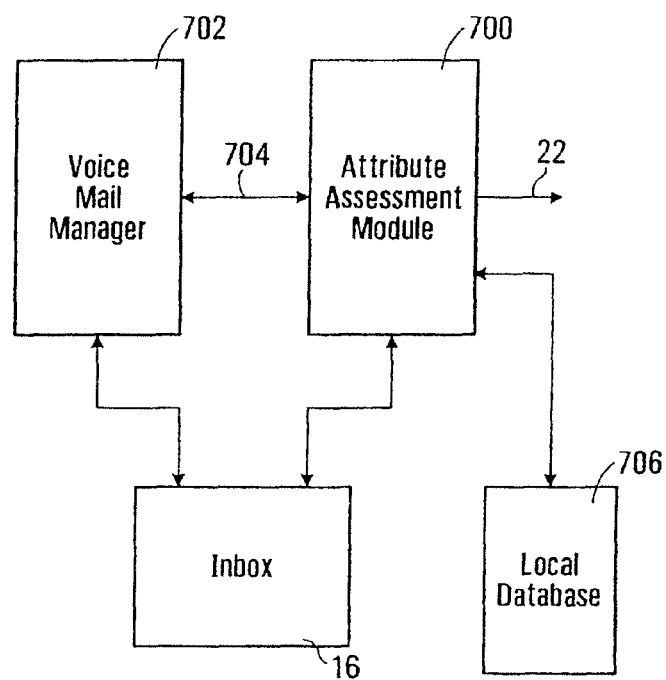
FIG. 7 is block diagram of a possible variant incorporating a message attribute assessment module.

If attribute information is desired but is not readily available from the network nor from the local voice mail inbox management program, an attribute assessment module can be provided to generate the desired attribute information. A block diagram of the attribute assessment module is shown in FIG. 7.

The attribute assessment module 700 can be software implemented and it functionally connects to the voice mail managing program 702 via link 704. The attribute assessment module 700 receives via link 704 voice mail message attributes that are available from the voice mail manager 702 (either implemented locally or on the network side), such as the identity of the caller that has left the message, the time and date at which the message was left and the degree of importance. The attribute assessment module 700 also communicates with the inbox 16 to extract attribute information if the particular attribute information desired is not readily available from the voice mail manager program 702. More particularly, the attribute assessment module 700 scans the memory location that implements the inbox 16 to derive the attribute information desired.

Finally, the attribute assessment module 700 communicates with a local database 706 containing personalization data that can be paired or coupled with attribute information available, for example, from the voice mail manager 702 in order to personalize the attribute information that will be displayed to the user. For instance, the data stored in the database 706 may be pictures of individuals that are displayed in the respective visualization structures to denote the identity of the caller that has left a voice mail message. Therefore, the database 706 maps the caller ID received from the network to a picture and includes this picture in the output data 22. The reader will appreciate that a wide variety of other personalization information can be stored in the database 706, an example of which includes a picture of the intended message recipient.

The above description made in connection with FIGS. 1 to 7 relates to an embodiment that handles voice mail messages. In a second embodiment a similar approach can be used to handle other types of electronic messages such as e-mail messages or SMS messages. Evidently, in the case of e-mail messages or SMS messages the message attributes that are depicted by the respective visualization structures can defer, and they can include additional elements such as:

The presence or the absence of an attachment.
If an attachment is present, the type of attachment such as document or picture.
If the message is encrypted.
The subject of the message.
The type of message, such as a message classified as junk mail, the party that has been copied (CC) and the mailing list to which the message has been sent, among others.
The intended recipient of the message.
The sender of the message, in particular whether the sender is in a contact list.
The presence or the absence of a calendar invite.
The urgency of the message.
Whether the message is a HyperText Markup Language (HTML) message or a plain text message.

The attribute information can be obtained in a manner which is similar to the way the input interface 20 works in connection with voice mail messages. For instance, the attribute information can be either pushed to the message notification program automatically (say in a periodic fashion) by the e-mail service, or upon occurrence of a certain event, such as the reception of the new message. Alternatively, the attribute information can be pulled by the message notification program from the e-mail service. This pulling operation can happen periodically, or on demand. Also, when the message notification program pulls the attribute information it may be designed to supply log-in credentials to the e-mail service such as to gain access to the mailbox from which the attribute information is derived.

Note that the actual messages do not need to be conveyed to the computer 10 on which the message notification program provides notifications for the messages, at the same time as the attribute information is being conveyed. One possibility is to gather only the attribute information as a first step and then gather one or more of the actual messages, as a second subsequent step, upon demand by a user. Another possibility is to gather the messages and the attribute information at the same time on the computer 10.

In a possible variant, the message notification program, for voice mail, e-mail or SMS can be implemented as a screen saver program. Screen saver programs were originally developed to prevent damage to computer displays by filling the display with moving images in order to avoid the so-called "burn-in" phenomena. Current displays are much less susceptible to burn-in so screen savers are predominantly used for entertainment or security purposes.

The entertainment component is provided by the visually attractive graphical effects that show on the computer screen. On the other hand the security component is implemented by configuring the screen saver to ask for authentication information before allowing the user to gain access to the computer.

The screen saver is invoked normally after a certain period of inactivity which can be set via a configuration feature. The period of inactivity can set to any amount of time.

When implementing the message notification program as a screen saver, the basic functionality of the screen saver is retained. More specifically, the message notification screen saver is triggered after a period of inactivity. The "inactivity" is assessed by observing user inputs at the keyboard or pointing device; if none is observed after a predetermined time period the message notification screen saver is triggered. When the message notification screen saver becomes active it completely or partially fills the display with graphical environment produced by the processing entity 24. The visualization structures are then visible within that graphical environment and allow the user to readily assess if electronic messages have been received, such as voice mail messages, e-mail messages or SMS messages, without the need to access the electronic messages inbox. The visualization features can be designed according to anyone of the examples discussed earlier.

When the graphical environment is designed in such a way to fill completely or most of the display, it provides a convenient privacy or security feature by hiding from view the information that is present on the display, such as texts on which the user is working. To enhance the security aspect, the message notification screen saver can be designed to request authentication such as a user ID and/or password before allowing the user to gain access to the computer. The message notification screen saver detects the presence of a user by sensing user commands or inputs at the keyboard and/or pointing device. When the presence of the user is sensed, the message notification screen saver invokes an authentication request where the user is requested to authenticate itself by providing user ID and/or password. The supplied user ID and/or password are then compared to stored authentication data and if a match is found the message notification screen saver deactivates and allows the user gain access to the computer.

Another possible option that may be considered in implementing the invention is to use a touch sensitive display on which the graphical environment including the visualization structures are rendered. The visualization structures can then be "touched" by a user to obtain a certain functionality, instead of having to use other input devices. Examples of functionalities include:

- Accessing the electronic mail message, such as playing the message in the case of voice mail or displaying the message in the case of e-mail or SMS message.
- Deleting the message.
- Dragging the visualization structure on the screen such as to change its location. In this fashion, the user can arrange the visualization structures to suit his or her preferences.

In another possible variant the processing entity 24 may be provided with a configuration feature that would allow the user to customize the display and in general set the manner in which the visualization structures are rendered. The customization feature could allow the user to select backgrounds and also themes upon which the visualization structures are based, such as visualization structures shaped as geometric figures, animals, fruits/vegetables, persons, transportation devices (automobiles, airplanes, trains), people, signs, industry equipment, sporting implements and art and craft depictions among many others. Another customizable feature could be the animation to be imparted to the visualization structures. Further, the configuration feature could allow the user to determine which attributes of electronic messages will be reflected in the visualization structures and how the visualization structures could react when they are designed to accept user inputs, such as in the case of a touch sensitive display implementation.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A method for notifying a user of a computer having a display about incoming messages stored in an inbox, the method comprising:
   a) receiving size information and originator information about a plurality of messages in the inbox;
   b) for each of the plurality of messages, generating a message visualization structure associated with the respective message, and determining a first non-textual visual feature of the message visualization structure on the basis of the size information of the message and a second non-textual visual feature of the message visualization structure on the basis of the originator information of the respective message;
   c) rendering on the display the visualization structures within a graphical environment in which the message visualization structures convey information about the messages, their respective size information, and their respective originator information in a non-textual-list manner, wherein at least one of the first non-textual visual feature and the second non-textual visual feature includes an animation of the message visualization structure associated with the corresponding message.

2. A method as defined in claim 1, wherein the visualization structures move in the graphical environment.

3. A method as defined in claim 1, wherein at least one of the first non-textual visual feature and the second non-textual visual feature includes the color of one of the visualization structures.

4. A method as defined in claim 1, wherein at least one of the first non-textual visual feature and the second non-textual visual feature includes a geometric feature of one of the visualization structures.

5. A method as defined in claim 1, wherein one of the visualization structures includes a pictogram.

6. A method as defined in claim 1, wherein one of the visualization structures includes a text field for displaying text based information.

7. A method as defined in claim 1, wherein the graphical environment defines a virtual reality.

8. A method as defined in claim 1, wherein the messages in the inbox are incoming voice mail messages.

9. A method as defined in claim 1, wherein the messages in the inbox are incoming e-mail messages.

10. A method as defined in claim 1, including communicating with a message service that includes the inbox to gather the size information.

11. A method as defined in claim 10, including sending a request to the message service to prompt the message service to generate the size information.

12. A method as defined in claim 11, including sending the request to the message service periodically.

13. A method as defined in claim 11, wherein the request includes log-in credentials to allow the message service to authenticate the request.

14. A method as defined in claim 10, including receiving the size information pushed from the message service.

15. A non-transitory computer readable storage medium containing a program for execution by a computer having a display, the program implementing a message notification system to notify a user about incoming messages stored in an inbox, the notification system comprising:

a) an input interface to receive size information and originator information about a plurality of messages in the inbox;
b) a processing entity coupled to the input interface for generating message visualization structure associated with each of the plurality of messages, for each message:
the processing entity determining a first non-textual visual feature of the message visualization structure on the basis of the size information of the respective message and determining a second non-textual visual feature of the message visualization structure on the basis of the originator information of the respective message;
c) an output interface for releasing output data to cause the display of the computer to render the visualization structures, the output data defining a graphical environment in which the message visualization structures are rendered on the display simultaneously and convey information about the messages, their respective sizes, and their respective originator information in a non-textual-list manner, wherein at least one of the first non-textual visual feature and the second non-textual visual feature includes an animation of the message visualization structure associated with the corresponding message.

16. A non-transitory computer readable storage medium as defined in claim 15, wherein the output data defines a graphical is environment in which the visualization structures move.

17. A non-transitory computer readable storage medium as defined in claim 16, wherein the visualization structures move randomly.

18. A non-transitory computer readable storage medium as defined in claim 16, wherein the visualization structures move and simulate a physical effect.

19. A non-transitory computer readable storage medium as defined in claim 15, wherein at least one of the first non-textual visual feature and the second non-textual visual feature includes the color of at least one of the visualization structures.

20. A non-transitory computer readable storage medium as defined in claim 15, wherein at least one of the first non-textual visual feature and the second non-textual visual feature includes a geometric feature of at least one of the visualization structures.

21. A non-transitory computer readable storage medium as defined in claim 15, wherein at least one of the visualization structures includes a pictogram.

22. A non-transitory computer readable storage medium as defined in claim 15, wherein at least one of the visualization structures appear to the eye as two-dimensional structure.

23. A non-transitory computer readable storage medium as defined in claim 15, wherein at least one of the visualization structures appear as three-dimensional structure.

24. A non-transitory computer readable storage medium as defined in claim 15, wherein a plurality of visualization structures associated to different messages appear as being stacked.

25. A non-transitory computer readable storage medium as defined in claim 15, wherein at least one of the visualization structures includes a text field for displaying text based information.

26. A non-transitory computer readable storage medium as defined in claim 15, wherein the messages in the inbox are incoming voice mail messages.

27. A non-transitory computer readable storage medium as defined in claim 15, wherein the messages in the inbox are incoming e-mail messages.

28. A non-transitory computer readable storage medium as defined in claim 15, wherein the graphical environment defines a virtual reality.

29. A non-transitory computer readable storage medium as defined in claim 15, wherein the input interface includes a filter to perform filtering on the size information.

30. A non-transitory computer readable storage medium as defined in claim 29, including a configuration module allowing a user to set a filtering behavior of the filter.

31. A non-transitory computer readable storage medium as defined in claim 15, including an input interface for communicating with a message service that includes the inbox to gather the size information.

32. A non-transitory computer readable storage medium as defined in claim 31, wherein the input interface sends a request to the message service to prompt the message service to generate the size information.

33. A non-transitory computer readable storage medium as defined in claim 32, wherein the input interface sends the request to the message service periodically.

34. A non-transitory computer readable storage medium as defined in claim 32, wherein the request includes log in credentials to allow the message service to authenticate the request.

35. A non-transitory computer readable storage medium as defined in claim 31, wherein the input interface receives the size information pushed from the message service.

36. A computerized telephone, comprising:
a) a user interface having a display;
b) a message notification system to notify a user about incoming voice mail messages stored in an inbox, the notification system comprising:
  i) an input interface to receive size information and originator information about a plurality of the incoming voice mail messages;
  ii) a processing entity coupled to the input interface for generating a message visualization structure associated with each of the plurality of voice mail messages, for each message:
    the processing entity determining a first non-textual visual feature of the message visualization structure on the basis of size information of the respective voice mail message and a second non-textual visual feature of the message visualization structure on the basis of originator information of the respective voice mail message;
  iii) an output interface for rendering on the display a graphical environment containing the visualization structure which convey information about the voice mail messages, their respective size information, and their respective originator information in a non-textual-list manner, wherein at least one of the first non-textual visual feature and the second non-textual visual feature includes an animation of the message visualization structure associated with the corresponding message.

37. A computerized telephone as defined in claim 36, wherein said computerized telephone is a cordless telephone including a base station and at least one handset that is capable of wireless communication with the base station.

38. A computerized telephone as defined in claim 37, wherein the base station comprises the display.

39. A computerized telephone as defined in claim 37, wherein the handset comprises the display.

40. A computerized telephone as defined in claim 36, wherein the display is touch sensitive, wherein the graphical environment is responsive to user inputs made by touching an area of the display.

41. A non-transitory computer readable storage medium containing a screen saver program for execution by a computer having a display, the screen saver program implementing a message notification system to notify a user about incoming messages stored in an inbox, the screen saver program comprising:
  a) an input interface to receive size information and originator information about messages in the inbox;
  b) a processing entity coupled to the input interface for generating a message visualization structure associated with each of the plurality of messages;
  c) an output interface for releasing output data to cause the display of the computer to render the visualization structures, the output data defining a graphical environment in which the message visualization structures are rendered on the display and convey information about the messages, their respective size information, and their respective originator information in a non-textual list manner, wherein at least one of the first non-textual visual feature and the second non-textual visual feature includes an animation of the message visualization structure associated with the corresponding message.

42. The method as defined in claim 1, wherein the messages in the inbox are incoming SMS messages.

43. The non-transitory computer readable storage medium as defined in claim 15, wherein the messages in the inbox are incoming SMS messages.

44. The method as defined in claim 8, wherein the size information of a particular message comprises an indication of a duration of the particular message.

45. The method as defined in claim 8, wherein the size information of a particular message comprises an indication of an amount of space occupied by the particular message when stored in the inbox.

46. The non-transitory computer readable storage medium as defined in claim 26, wherein the size information of a particular message comprises an indication of a duration of the particular message.

47. The non-transitory computer readable storage medium as defined in claim 26, wherein the size information of a particular message comprises an indication of an amount of space occupied by the particular message when stored in the inbox.

* * * * *

UNITED STATES PATENT AND TRADEMARK OFFICE
CERTIFICATE OF CORRECTION

PATENT NO. : 9,537,674 B2
APPLICATION NO. : 12/810389
DATED : January 3, 2017
INVENTOR(S) : Karen Freeman et al.

It is certified that error appears in the above-identified patent and that said Letters Patent is hereby corrected as shown below:

In the Claims

Column 13, Line 29, Claim 16, after "graphical" delete "is".

Signed and Sealed this
Twenty-eighth Day of February, 2017

Michelle K. Lee
*Director of the United States Patent and Trademark Office*